(12) United States Patent
Heimroth et al.

(10) Patent No.: US 10,364,911 B2
(45) Date of Patent: Jul. 30, 2019

(54) VALVE ACTUATION SYSTEM

(71) Applicant: Festo AG & Co. KG, Esslingen (DE)

(72) Inventors: Marcel Heimroth, Denkendorf (DE); Markus Dreher, Stuttgart (DE); Michael Kanthack, Wimsheim (DE)

(73) Assignee: FESTO AG & Co. KG, Esslingen (DE)

(*) Notice: Subject to any disclaimer, the term of this patent is extended or adjusted under 35 U.S.C. 154(b) by 224 days.

(21) Appl. No.: 15/510,164

(22) PCT Filed: Aug. 13, 2015

(86) PCT No.: PCT/EP2015/068685
§ 371 (c)(1),
(2) Date: Mar. 9, 2017

(87) PCT Pub. No.: WO2016/037795
PCT Pub. Date: Mar. 17, 2016

(65) Prior Publication Data
US 2017/0261119 A1    Sep. 14, 2017

(30) Foreign Application Priority Data
Sep. 11, 2014   (DE) .................. 10 2014 013 391

(51) Int. Cl.
*F15B 15/14*   (2006.01)
*F15B 21/00*   (2006.01)
(Continued)

(52) U.S. Cl.
CPC ...... *F16K 31/1221* (2013.01); *F15B 15/1433* (2013.01); *F15B 21/003* (2013.01); *F16K 27/02* (2013.01); *Y10T 137/5109* (2015.04)

(58) Field of Classification Search
CPC .......... F16K 27/00; F16K 27/02; F16K 27/08; F16K 27/12; F16K 31/1221; F15B 15/1433; F15B 21/003; Y10T 137/5109
(Continued)

(56) References Cited

U.S. PATENT DOCUMENTS 2,096,444 A * 10/1937 Arvintz .................. A62C 4/00
                                                                137/269
3,228,258 A *  1/1966 Bredtschneider ....... F16K 27/08
                                                                74/625
(Continued)

FOREIGN PATENT DOCUMENTS

CN      102537486     7/2012
DE      202006000916  3/2006
(Continued)

*Primary Examiner* — Robert K Arundale
*Assistant Examiner* — Jonathan J Waddy
(74) *Attorney, Agent, or Firm* — Hoffmann & Baron, LLP

(57) ABSTRACT

A valve actuation system includes a drive device, equipped with an axial extension, which includes an actuating drive with a drive output side intended for coupling with a valve and an axial rear side opposite this, wherein the actuating drive has on its axial rear side a mounting interface for the attachment of an auxiliary device which interacts with the actuating drive wherein, in order to allow attachment of the particular auxiliary device which is to be mounted, or which is mounted, the mounting interface of the actuating drive is equipped with several different attachment devices which differ in their attachment possibilities and which can be used selectively. In this way, a high degree of variability in the attachment of auxiliary devices is provided.

15 Claims, 5 Drawing Sheets

(51) Int. Cl.
*F16K 27/02* (2006.01)
*F16K 31/122* (2006.01)

(58) Field of Classification Search
USPC .......................................................... 137/269
See application file for complete search history.

(56) References Cited

U.S. PATENT DOCUMENTS

| | | | |
|---|---|---|---|
| 4,744,386 A | 5/1988 | Frazer | |
| 6,086,040 A | 7/2000 | Petersen | |
| 2002/0179875 A1* | 12/2002 | Davis | B67D 1/0835 |
| | | | 251/149.6 |
| 2009/0194180 A1* | 8/2009 | Domyo | F16K 27/12 |
| | | | 137/800 |
| 2011/0272616 A1 | 11/2011 | Anderson et al. | |
| 2011/0278488 A1* | 11/2011 | Feser | F16K 27/02 |
| | | | 251/324 |
| 2014/0138564 A1 | 5/2014 | Adams et al. | |

FOREIGN PATENT DOCUMENTS

| | | |
|---|---|---|
| DE | 102004049512 | 4/2006 |
| DE | 102010014629 | 10/2011 |
| DE | 102011110384 | 2/2013 |
| EP | 0416788 | 3/1991 |
| EP | 1643175 A2 | 4/2006 |
| EP | 1643175 B1 | 2/2011 |
| WO | WO2015149898 | 10/2015 |

\* cited by examiner

VALVE ACTUATION SYSTEM

This application claims priority based on an International Application filed under the Patent Cooperation Treaty, PCT/EP2015/068685, filed Aug. 13, 2015, which claims priority to DE102014013391.5, filed Sep. 11, 2014.

BACKGROUND OF THE INVENTION

The invention relates to a valve actuation system with a drive device, equipped with an axial extension, which comprises an actuating drive with an axial drive output side intended for coupling with a valve and an axial rear side opposite this, wherein the actuating drive has on its axial rear side a mounting interface for the attachment of an auxiliary device which interacts with the actuating drive, for example an indicator module, a control head or a positioner.

A valve actuation system of this type known from EP 1 643 175 B1 possesses an elongated drive device which is mounted, with an axial drive output side forward, on a valve designed in particular as a process valve. The valve, often also described as a valve armature, contains a valve member which can be positioned in different operating positions with the aid of the drive device in order to control a fluid flow. For the purpose of actuating the valve member, the drive device contains a pneumatic actuating drive which has on its axial rear side facing away from the valve a standardised mounting interface which makes possible the optional connection of different designs of control modules. A disadvantage of this design is that the different designs of control modules need to be equipped with standardised mating interfaces specifically matched to the standardised interface, which makes the manufacture of the control modules or any other auxiliary devices which are to be attached to the actuating drive more expensive. Alternatively, the use of adapters is conceivable, which would however be associated with additional manufacturing and assembly costs.

SUMMARY OF THE INVENTION

The invention is based on the object of creating a valve actuation system the actuating drive of which can be equipped economically with different auxiliary devices.

In order to achieve this object, in combination with the aforementioned features it is proposed that, in order to allow attachment of the particular auxiliary device which is mounted, or which is to be mounted, the mounting interface of the actuating drive should be equipped with several attachment devices which differ in their attachment possibilities and which can be used selectively.

In this way, a wide variety of different auxiliary devices can be mounted on the same mounting interface of the actuating drive, wherein, in departure from the concept of standardisation of the attachment means, the mounting interface provides a plurality of different attachment devices which differ in terms of the attachment possibilities provided. Each attachment device defines its own attachment interface which can be used independently of the other attachment interfaces. When attaching an auxiliary device, the available attachment devices can thus be used selectively or alternatively. The user of the valve actuation system is thus very flexible when it comes to attachment of the auxiliary components and can in most cases dispense with the use of mounting adapters. The costs of the auxiliary devices can also be reduced, because they do not necessarily need to be adapted to a single attachment device which may be unfavourable for the auxiliary device in question. The auxiliary devices which can be mounted on the actuating drive are devices of any kind which are necessary or simply useful for the operation of the valve actuation system. For example, this may be an indicator module indicating the operating position of the actuating drive, a control head equipped with control components or a positioner for position-controlled actuation of the actuating drive. A stroke limiter module is also conceivable as an auxiliary device which can be mounted on the actuating drive. The indicator module is in the simplest case an at least partially transparent indicator cover plate. The list of attachable auxiliary devices is not to be considered definitive.

Advantageous further developments of the invention are described in the dependent claims.

The valve actuation system is expediently equipped with a valve, which can be actuated by means of the drive device, to which the drive device can be or is attached with the drive output side of the actuating drive foremost. A preferred use of the valve actuation system is in process engineering, so that one can also speak of a process valve.

The actuating drive expediently has a housing, referred to as a drive housing, in which the output member which can be driven to perform a drive output movement is arranged which, in the state of the drive device in which it is attached to a valve, interacts in a driving manner with a valve member of the valve. Preferably, the actuating drive is a fluid-driven actuating drive, in particular a pneumatic drive. If the auxiliary device is designed as a control head or as a positioner, the drive output movement of the output member and/or the assumed operating position of the output member can be controlled and/or regulated with the aid of said auxiliary device. An auxiliary device designed as an indicator module allows a visual monitoring of the position of the output member and for example has a transparent region through which the position of an indicator element movably coupled with the output member is visible.

Preferably, the mounting interface of the actuating drive is equipped with at least one and preferably with exactly one axially oriented mounting surface against which the particular auxiliary device which is to be mounted can be placed. A distinction should be made between this mounting surface and the several different attachment devices which can be selectively used in order to attach the auxiliary device currently mounted on the mounting surface and form a stable assembly with the actuating drive.

From a costs/benefits aspect it has proved advantageous if the mounting interface is equipped with exactly two or with exactly three different attachment devices.

One of the attachment devices is expediently a central fastening recess provided with an inner thread. It is designed to allow a fastening element provided with an outer thread which is associated with the auxiliary device which is to be fitted to be screwed into it. Preferably, the central fastening recess is formed in an axial connection socket of the actuating drive positioned centrally in the mounting interface which, consequently, can also be described as a screw connection socket.

A further advantageous attachment device is conceived as an axial locking device and makes possible an axially immovable fixing of the attached auxiliary device on the basis of a locking principle. The axial locking device has an annular locking flange which can be engaged behind, in an axial direction, radially from the outside, which is oriented at least partially in the direction of the actuating drive and which can be engaged behind by a locking element associated with the auxiliary device in order to prevent the auxiliary device from lifting off. Alternatively, the axial locking device can have a locking element which is separate from the connecting socket, for example a snap ring.

It is advantageous if the locking flange slopes such that the auxiliary device is pressed against the actuating drive with an axial clamping force when a locking element acts on the locking flange. In particular, a locking screw can be used as the locking element—preferably a plurality thereof being supported on the auxiliary device and capable of being brought into locking engagement with the locking flange. Expediently, several locking elements are used simultaneously which bear on points on the locking flange distributed in a peripheral direction or alternatively on the periphery of the locking element, in particular the snap ring.

The axial locking device is expediently positioned in the central region of the mounting interface.

It is also advantageous if the axial locking device is formed on a connecting socket of the actuating drive positioned in the central region of the mounting interface. The locking flange can thereby be part of a circumferential slot or a circumferential collar formed on the outer periphery of the connecting socket. The same connecting socket can have two different attachment devices and, for example, in addition to the axial locking device can also define the aforementioned central fastening recess provided with an inner thread.

A further advantageous attachment device is designed as a threaded fastening hole arrangement which has several threaded fastening holes distributed around a longitudinal axis of the actuating drive which are axially oriented. These threaded fastening holes are expediently grouped into a circle of threaded fastening holes arranged concentrically with the longitudinal axis of the actuating drive. Each threaded fastening hole is designed to receive a fastening screw, with the aid of which an auxiliary device is fastened to the mounting interface.

It is regarded as an advantageous basic version of the valve actuation system if the actuating drive has exactly two attachment devices on the mounting interface, in particular the aforementioned central fastening recess provided with an inner thread and in addition the axial locking device. The threaded fastening hole arrangement is preferably simply provided as an option. Naturally, it is also possible for two other attachment devices or more than two different attachment devices to be formed simultaneously on the mounting interface of the actuating drive.

In order to increase even further its flexibility in terms of the economical attachment of auxiliary devices, the valve actuation system can be equipped with one or more mounting adapters which can be fixed to the different attachment devices formed on the mounting interface of the actuating drive. Each of these mounting adapters has at least one secondary attachment device with the aid of which the auxiliary device which is, or is to be, mounted on the mounting interface can be attached. Consequently, the user has the possibility of either using the different attachment devices of the mounting interface to attach auxiliary devices directly or of attaching these indirectly via an intermediate mounting adapter.

Preferably, the valve actuation system is equipped with several mounting adapters which can be mounted alternatively on the mounting interface and which differ from one another in the design of their secondary attachment devices. For example, a mounting adapter can have a central fastening recess provided with an inner thread and a further mounting adapter can have an axial locking device on its outer periphery. However, the same mounting adapter can also have several secondary attachment devices which differ in terms of the attachment possibilities which are made available.

The mounting adapters equipped with different secondary attachment devices can, optionally, be equipped with identical mechanical mating attachment interfaces with the aid of which they can be fixed to only one of the several different attachment devices of the actuating drive. However, the advantageous possibility also exists of equipping the several mounting adapters, which differ in the design of their secondary attachment devices, with different mating attachment interfaces which are each only matched to one of the several different attachment devices of the actuating drive.

If the actuating drive is of the fluid-operated type, it is advantageous if the mounting interface is equipped with a fluid transmission device which communicates fluidly with the mounted auxiliary device if the auxiliary device is equipped with fluid technology features. In this way it can be guaranteed that when attaching the auxiliary device the fluid connections necessary for the operation of the drive device can be established automatically.

For example, the fluid transmission device can have one or more, in particular detachably inserted or insertable, connection nipples which plug into the actuating drive one the one hand and into the auxiliary device on the other hand in order to connect together fluid channels formed in the two components.

BRIEF DESCRIPTION OF THE DRAWINGS

The invention is explained in more detail in the following with reference to the attached drawing, in which.

DETAILED DESCRIPTION OF THE PREFERRED EMBODIMENTS

Figure 1:
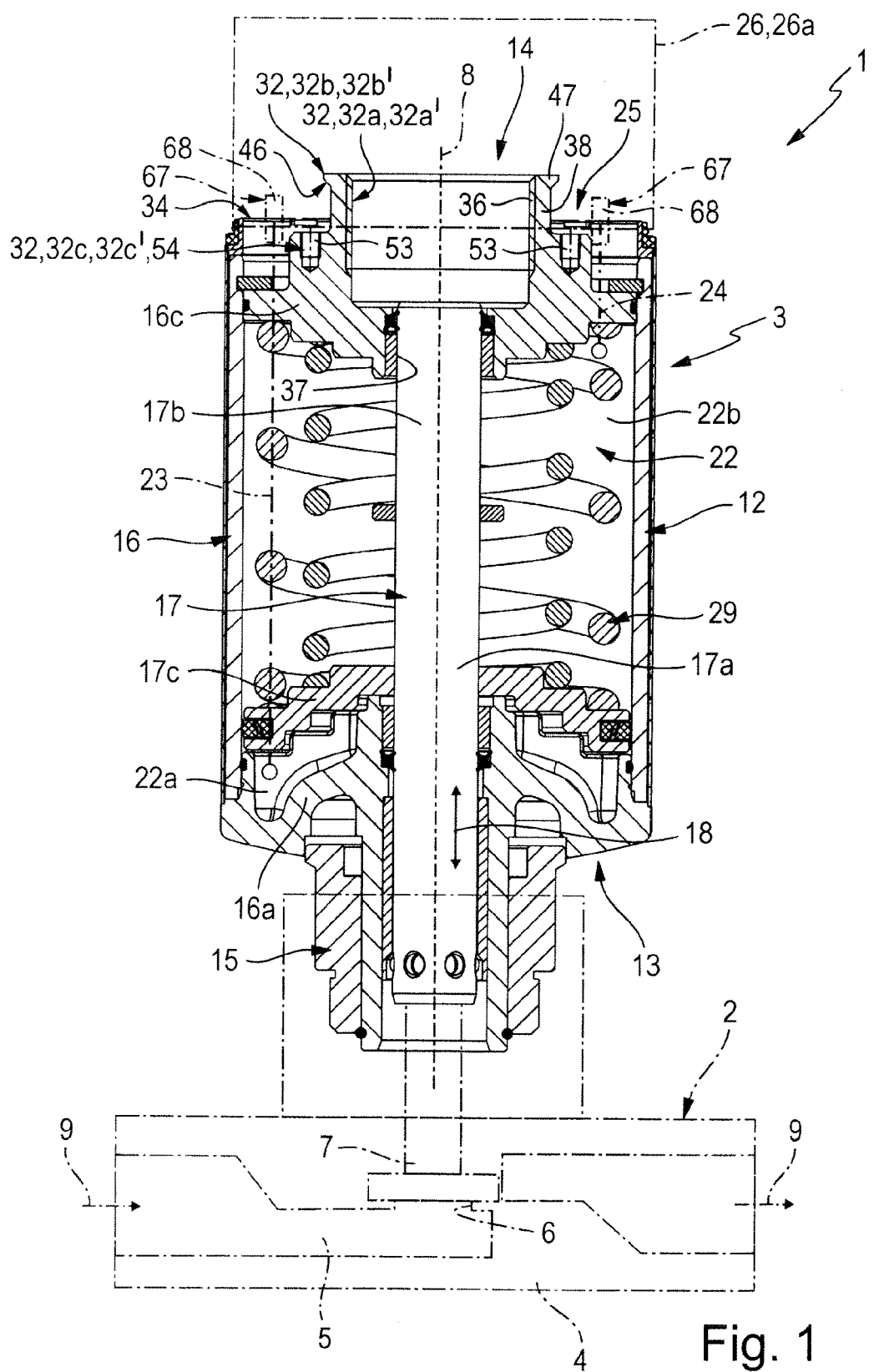
FIG. 1 shows a preferred embodiment of the valve actuation system according to the invention in a longitudinal section, wherein an auxiliary device which can be mounted on an actuating drive is only indicated by dotted-dashed lines, as is a valve associated with the valve actuation system.

The valve actuation system, identified as a whole with the reference number 1, contains a drive device 3 serving to actuate a valve 2, only indicated schematically, used to control a fluid flow, wherein the valve 2 is expediently also a part of the valve actuation system 1.

The valve 2 has a valve housing 4 which is passed through by a fluid channel 5, in the course of which there is an overflow orifice 6 to which a valve member 7 is assigned. The valve member 7 is moveable in a linear manner and can be positioned selectively in a closing position closing the overflow orifice 6 or in at least one open position opening the overflow orifice 6. In the open position of the valve member 7, a fluid can flow through the fluid channel 5 as indicated by the arrows 9. The flow rate depends on the currently opened flow cross section of the overflow orifice 6.

The drive device 3 has a longitudinal extension and accordingly an imaginary longitudinal axis 8. Associated with the drive device 3 is an actuating drive 12 which has the same longitudinal axis 8 as the drive device 3. The actuating drive 12 has an axial drive output side 13, pointing downwards in the drawing, and an axial rear side 14 axially opposite this, pointing upwards in the drawing. On the axial drive output side 13, the actuating drive 12 is equipped with a coupling device 15, with the aid of which it can be or is attached to the valve 2, in particular in a detachable manner.

The actuating drive 12 has a drive housing 16 which can be or is attached, preferably detachably, to the valve housing 4 with the aid of the coupling device 15. Accordingly, the drive housing 16 and the valve housing 4 form a single assembly during operation of the valve actuation system 1.

In the interior of the drive housing 16 there extends an output member 17 of the actuating drive 12 which, through corresponding actuation, can be driven to perform a back-and-forth drive output movement 10, indicated by a double arrow, this being a linear movement coinciding with the axial direction. The output member 17 interacts with the valve member 7 in a driving manner and is expediently coupled with the valve member 7 in terms of axial movement, in particular in the region of the coupling device 15.

By way of example, the output member 17 contains an output drive rod 17a, coupled so as to move axially with the valve member 7, in particular with a so-called spindle of the valve member 7, which passes, in a slidingly displaceable manner, through a front end wall 16a of the drive housing 16 associated with the axial drive output side 13 and which, in an interior housing space 22 of the drive housing 16, is connected with a drive piston 17c which is mounted, in a slidingly displaceable manner, in the interior housing space 22 so as to form a seal.

The drive piston 17c divides the interior housing space 22 into a front housing chamber 22a facing the front end wall 16a and an axially opposite rear housing chamber 22b limited in the region of the axial rear side 14 by a rear end wall 16c of the drive housing 16.

An actuating force can be applied to the output member 17 in order to cause the drive output movement 18. The nature of the actuating force depends on the construction type of the actuating drive 12. This force can certainly be generated electromechanically. However, it is advantageous if the actuating drive 12 is a fluid-driven and in particular a pneumatic actuating drive 12, which is the case in the exemplary embodiment, so that the actuating force results from an application of pressurised fluid to the drive piston 17c.

The fluid-driven actuating drive 12 can be of single-action or double-action construction type. In this example, a single-action construction type is used, wherein a spring device 29 arranged in the rear housing chamber 22b biases the output member 17 permanently in the direction of the front end wall 16a, as a result of which the valve member 7 is permanently biased in the closing direction. This leads to an advantageous "normally closed" configuration. Via a first fluid control channel 23, passing through the wall of the drive housing 16, which opens into the front housing chamber 22a, the front housing chamber 22a can be pressurised with a fluid pressure medium in order to move the output member 17 in the direction of the rear end wall 16c and thereby simultaneously move the valve member 7 into an open position.

The actuating drive 12 is equipped, on the outside of its axial rear side 14, with a mounting interface 25 on which an auxiliary device 26 which is necessary or useful for the operation of the valve actuation system 1 can be mounted, in particular in a detachable manner. In FIGS. 1, 4 and 6 to 8 this auxiliary device 26 is only indicated schematically by dotted-dashed lines. The mounting interface 25 makes possible the alternative attachment of different types of auxiliary devices 26, whereby the type of auxiliary device 26 which will be or is mounted on the mounting interface 25 depends in particular on the application of the valve actuation system 1 and/or the user's requirements.

Figure 5:
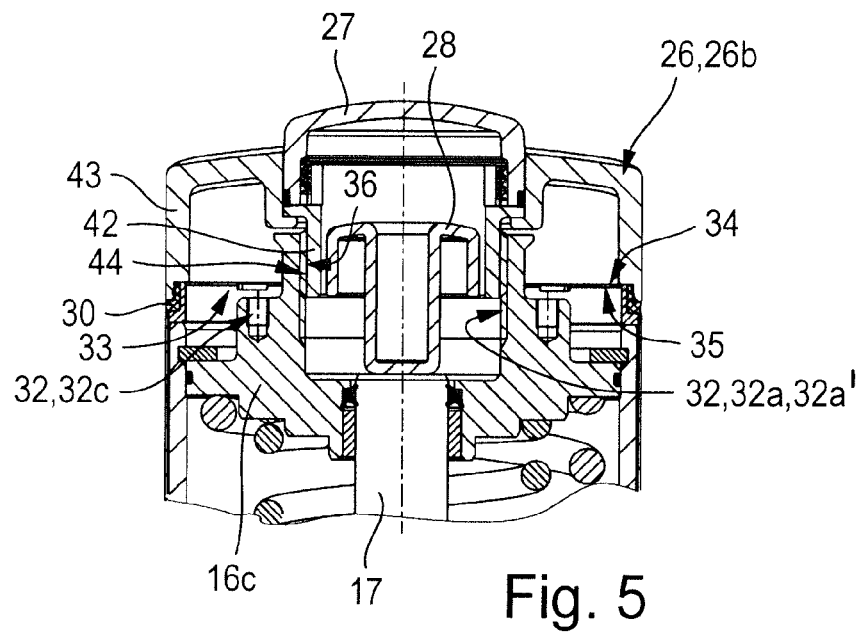
FIG. 5 shows the rear-side end section of the valve actuation system in a representation comparable with FIG. 2, wherein a different construction design of an auxiliary device, in comparison with FIG. 2, is mounted on the actuating drive.
Figure 6:
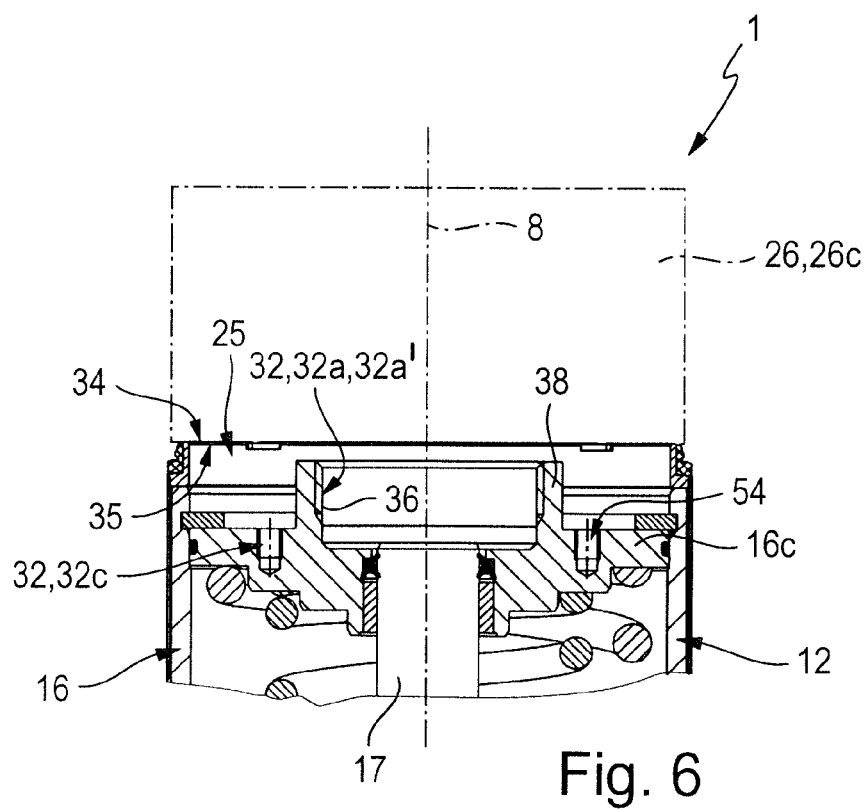
FIG. 6 shows the rear-side end region of the actuating drive of a further embodiment of the valve actuation system according to the invention viewed in longitudinal section, wherein a mounted auxiliary device is only indicated by dotted-dashed lines.
Figure 7:
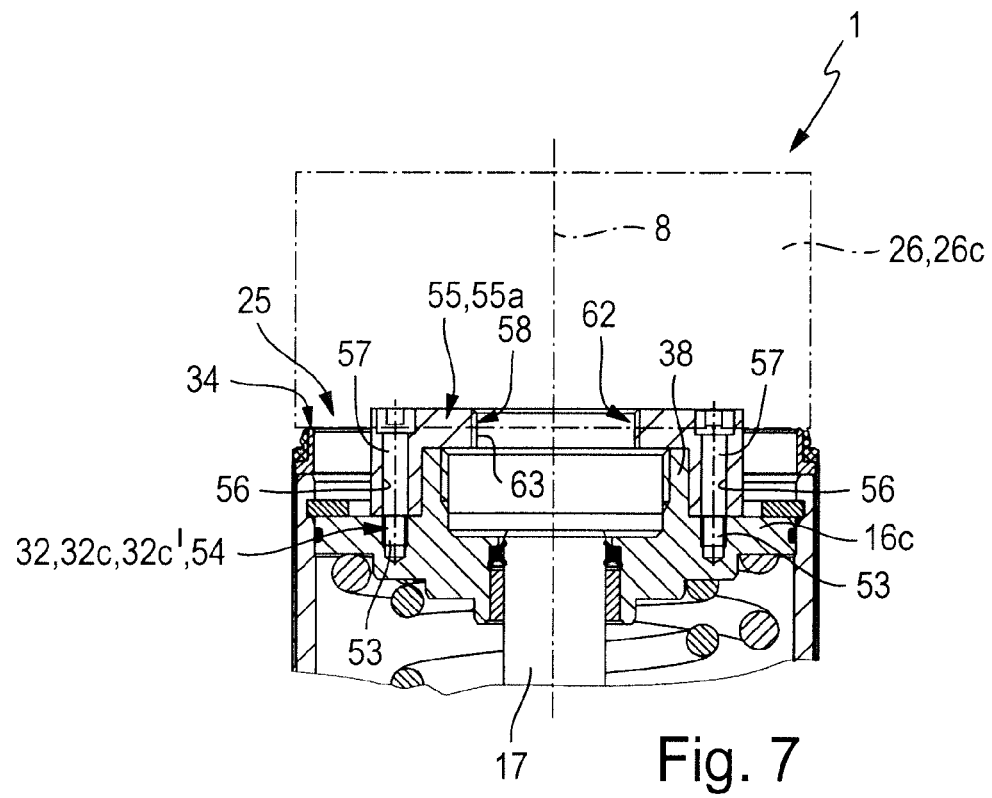
FIG. 7 shows the valve actuation system from FIG. 6, wherein a possible first embodiment of a mounting adapter is mounted on the mounting interface.
Figure 8:
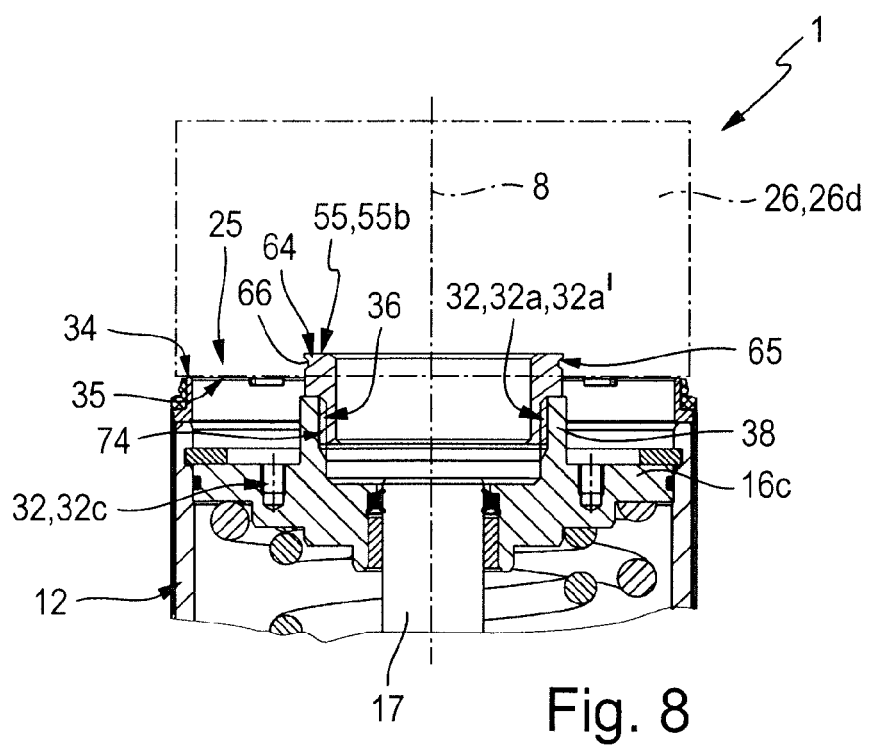
FIG. 8 shows the valve actuation system from FIGS. 6 and 7, wherein an embodiment of a mounting adapter which differs from the mounting adapter shown in FIG. 7 is mounted on the mounting interface.

Different construction designs of auxiliary devices 26 which can be attached selectively to the mounting interface 25 are illustrated in the drawing, in some cases only schematically. The auxiliary device 26 illustrated in FIGS. 1 to 4 is a position controller 26a, which can also be described as a "positioner". FIG. 5 shows an auxiliary device 26 in the form of an indicator module 26b. In connection with the exemplary embodiment shown in FIGS. 6 to 8, FIGS. 6 and 7 show an auxiliary device 26 formed by a control head 26c, while FIG. 8 shows an auxiliary device 26 which is a stroke limiter module 26d for limiting the stroke of the output member 17.

A positioner 26a is usually designed such that it allows a position-controlled movement and positioning of the output member 17. By way of example it is equipped with electrically operable control valves, not illustrated, and also contains control electronics.

The indicator module 26b includes a transparent wall 27, in axial extension of the output drive rod 17a, through which the position of a movable indicator element 28 is visible, the position of which is influenced or determined through the axial position of the output member 17. The indicator element 28 cooperates in particular with a rear-side extended section 17b of the output drive rod 17a.

The control head 26c expediently contains an electrically operable control valve device by means of which a controlled pressurisation of the front housing chamber 22a with fluid can be effected via the first fluid control channel 23 in order to cause the drive output movement 18. This front housing chamber 22a is also pressurised in a controlled manner with compressed air in the design as a positioner 26a. The possibility also exists of using an, expediently, additionally provided second fluid control channel 24 communicating with the rear housing chamber 22b for the controlled or regulated actuation of the output member 17.

The stroke limiter module 26d contains limit stop means, not illustrated in detail, which project into the travel path of the output member 17, in particular of the extended section 17b. The position of the limit stop means is, expediently, variably adjustable. In particular, it limits the opening stroke of the output member 17 to a dimension which can be adjusted by the user.

The actuating drive 12 is simultaneously equipped, in the region of its mounting interface 25, with several different attachment devices 32a, 32b, 32c which differ from one another in terms of their attachment possibilities, that is to say in the possibilities for attaching an auxiliary device 26 which they provide. Each attachment device 32a, 32b, 32c defines an independent attachment interface.

Where the different attachment devices 32a, 32b, 32c are referred to collectively in the following, this is done using the common reference number "32".

The different attachment devices 32 can be used selectively, that is to say alternatively, and offer the possibility of selectively mounting different auxiliary devices 26, equipped with mechanical mating attachment interfaces 33, on the same mounting interface 25. Consequently, the valve actuation system 1 offers, at relatively low cost, a high degree of variability in the alternative attachment of different auxiliary devices 26.

Notwithstanding the different attachment devices 32, it is advantageous if the mounting interface 25 has at least one and preferably exactly one axially oriented mounting surface 34 on the actuating drive 12 on which the auxiliary device 26 which is to be attached can be placed. Expediently, the particular auxiliary device 26 which is to be or is attached can be or is clamped axially together with the mounting surface. The mounting surface 34 is located on the outside of the axial rear side 14 and points away from the actuating drive 14 in an axial direction.

Each auxiliary device 26 expediently has a mating mounting surface 35 which lies against the mounting surface 34 when the auxiliary device is mounted on the actuating drive 12.

If necessary, a seal 30 can be integrated between the mounting surface 34 and the mating mounting surface 35 in order to prevent impurities from penetrating into the joint region.

Each mating mounting surface 35 expediently forms part of the mechanical mating attachment interface 33 formed on the relevant auxiliary device 26.

The mounting surface 34 is formed on the axial rear side 14 of the actuating drive 12 independently of the several different attachment devices 32.

The actuating drive 12 is equipped on its mounting interface 25 with at least two attachment devices 32 which differ in terms of their attachment possibilities. The exemplary embodiment illustrated in FIGS. 1 to 5 is simultaneously equipped with three attachment devices 32, 32a, 32b, 32c, while the exemplary embodiment illustrated in FIGS. 6 to 8 is, by way of example, equipped with only two different attachment devices 32, 32a, 32c.

What both exemplary embodiments have in common is that they have a first attachment device 32a on the mounting interface 25 which is in the form of a central fastening recess 32a' with an inner thread 36. The central fastening recess 32a' has a longitudinal axis which coincides with the longitudinal axis 8 and is in particular formed in the rear end wall 16c. The central fastening recess 32a' is open towards the rear side of the actuating drive 12, that is to say it has a recess opening facing the attached auxiliary device 26.

Expediently, the central fastening recess 32a' connects with an adjoining axial opening 37 in the rear end wall 16c, into which the rod-formed extended section 17b of the output drive rod 17a projects in a slidingly displaceable manner such that it can cooperate with a correspondingly designed auxiliary device 26, for example for the purpose of stroke limitation or indication of position.

The central fastening recess 32a' is preferably formed in an axial connecting socket 38 of the actuating drive 12 arranged in the central region of the mounting interface 25. Since it forms a screw-connection possibility, it can also be described as a screw connection socket.

FIG. 5 illustrates the possibility of attaching an auxiliary device 26, in this case designed, by way of example, as an indicator module 26b, to the actuating drive 12 by means of a threaded sleeve 42 using the central fastening recess 32a'. The indicator module 26b has a cover 43 carrying the mating mounting surface 35 with a central opening into which a stepped threaded sleeve 42 which engages radially behind the cover 43 is fitted which has an outer thread 44 with which it is in screwed engagement with the inner thread 36 of the central fastening recess 32a'.

In the exemplary embodiment shown in FIGS. 1 to 5, a second attachment device 32b of the several different attachment devices 32 is designed as an axial locking device 32b'. This is equipped with an annular locking flange 46 which can be engaged behind from outside in a radial direction, which is arranged concentrically with the longitudinal axis 8 and which is preferably inclined relative to the longitudinal axis 8. The locking flange 46 expediently points radially and obliquely outwards and simultaneously axially in the direction of the actuating drive 12. It is expediently spaced axially outwards relative to the mounting interface 25.

The locking flange 46 is in particular located in the central region of the mounting interface 25. It is particularly advantageous if it is formed on the radial outer periphery of the axial connecting socket 38, which also forms the central fastening recess 32a'. Naturally, in order to attach the axial locking device 32b', alternatively an axial connecting socket 38 can also be provided which is only equipped with the axial locking device 32b'.

In the exemplary embodiment shown in FIGS. 1 to 5, the locking flange 46 advantageously forms part of a radially projecting circumferential collar 47 of the connecting socket 38.

Figure 2:
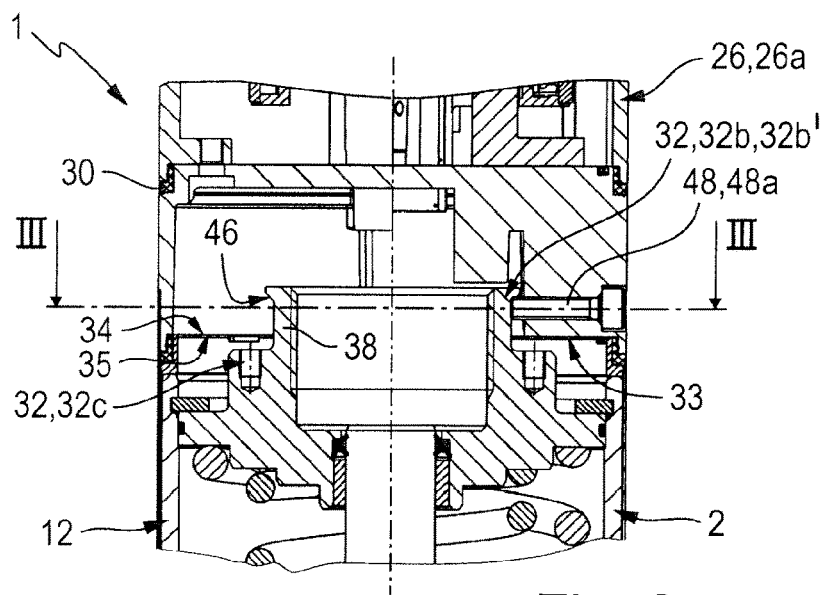
FIG. 2 shows a section of the valve actuation system from FIG. 1 in the region of the axial rear side which is provided with the mounting interface, wherein a first embodiment of an auxiliary device is shown in its mounted state.
Figure 3:
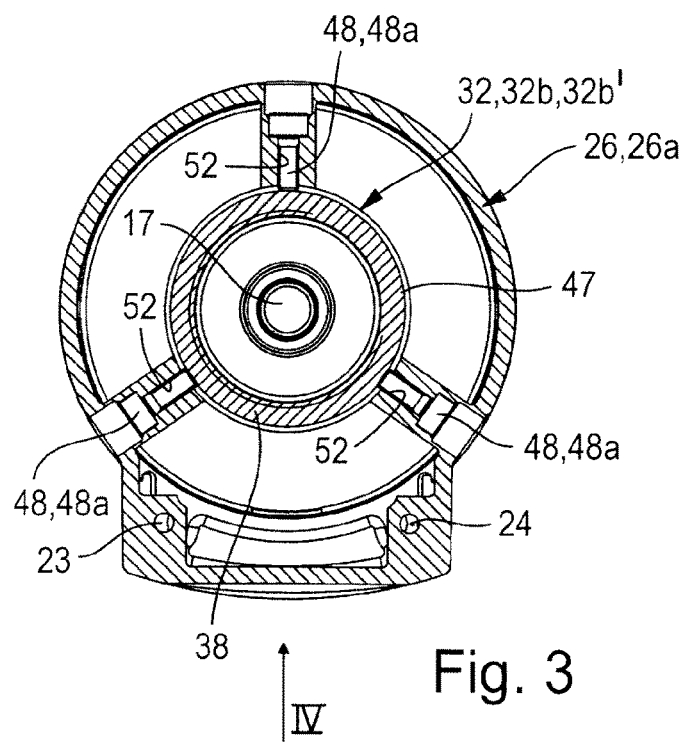
FIG. 3 shows a cross section through the section line from FIGS. 2 and 4.
Figure 4:
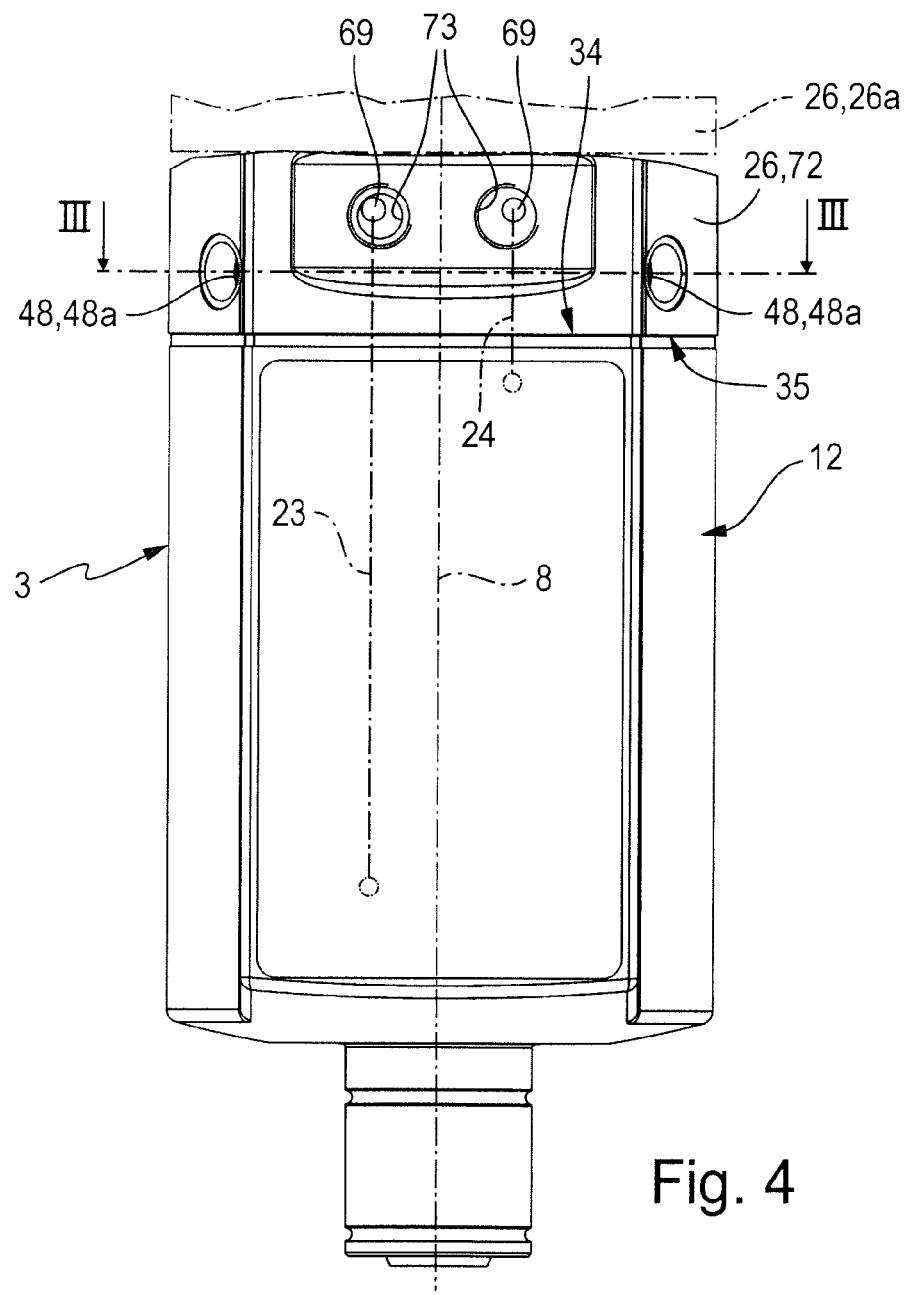
FIG. 4 shows a side view of the valve actuation system viewed in the direction indicated by the arrow IV in FIG. 3.

The axial locking device 32b' can for example be used as illustrated in FIGS. 2 to 4. The auxiliary device 26, 26a placed on the mounting surface 34 contains at least one and expediently several movable locking elements 48 which are supported on the auxiliary device 26, 26a and which are adjustable in relation to this, so that they press radially from outside against the locking flange 46. This operation results on the one hand in a form-locking engagement from behind and on the other hand ensures that an axial clamping force is caused by means of which the auxiliary device 26 is pressed firmly against the mounting surface 34.

The locking elements 48 are in particular screws 48a which are screwed into threaded holes 52 of the auxiliary device 26, 26a which are oriented radially relative to the longitudinal axis 8 and which can be clamped together with the inclined locking flange 46. Preferably, several locking elements 48 or screws 48a are distributed, preferably evenly, around the longitudinal axis 8.

The valve actuation system 1 shown in FIGS. 1 to 5 is also equipped with a third attachment device 32, 32c which is in the form of a threaded fastening hole arrangement 32c'. This threaded fastening hole arrangement 32c' includes a plurality of axially oriented threaded fastening holes 53 which are distributed at a radial distance from the longitudinal axis 8 of the actuating drive 12 around this longitudinal axis 8. The threaded fastening holes 53 are in particular formed in the rear end wall 16c and preferably form a circle of threaded fastening holes 54 arranged concentrically with the longitudinal axis 8. In combination with a connecting socket 38 it is advantageous if the circle of threaded fastening holes 54 surrounds the connecting socket 38 concentrically at a radial distance.

The exemplary embodiments shown in FIGS. 1 to 5 illustrate the possibility of attaching different auxiliary devices 26 directly to the actuating drive 12 using attachment devices 32 individually matched to them. The same possibility of direct attachment is also offered by the exemplary embodiment shown in FIGS. 6 to 8. On the other hand, the further possibility is illustrated, with reference to the exemplary embodiment shown in FIGS. 6 to 8, of at least one auxiliary device 26 only being attached indirectly to the different attachment devices 32a, 32b, 32c using an intermediate mounting adapter 55.

The exemplary embodiment shown in FIGS. 6 to 8 is, as already mentioned, equipped with only two attachment devices 32, 32a, 32c but can also readily include at least one further attachment device 32 offering yet another attachment possibility.

FIG. 7 illustrates a first mounting adapter 55, 55a which is attached to the mounting surface 34 of the actuating drive 12 by means of the attachment possibility provided by the third attachment device 32c. The preferably annular first mounting adapter 55, 55a is fitted axially onto the axial connecting socket 38, which in this example does not have any locking flange 46, so that it surrounds this connecting socket 38 radially on the outside, with radial centring, and lies against the mounting surface 34. The first mounting adapter 55, 55a has axial through-holes 56, aligned with the fastening holes 53 of the threaded fastening hole arrangement 32c', into each of which a fastening screw 57 is inserted which is screwed into the aligned threaded fastening hole 53. In this way, the first mounting adapter 55a is clamped together with the mounting surface 34 of the mounting interface 25.

In this case the first attachment device 32, 32a, if present, is not used. Instead, the first mounting adapter 55, 55a is equipped with a secondary attachment device 58 which is designed on the lines of the first attachment device 32, 32a described above and includes a central fastening recess 62 which is provided with an inner thread 63. In this way, an auxiliary device 26 formed by way of example by a control head 26c can be fixed to the first mounting adapter 55a in a comparable way to the way in which, in FIG. 5, the indicator module 26b is attached using the central fastening recess 62 and the inner thread 63. FIG. 7 shows that, through the use of the first mounting adapter 55a, the possibility exists of providing an inner thread 63 for attachment purposes which has a smaller diameter than the inner thread 36 of the first attachment device 32, 32a.

The valve actuation system 1 can include at least one further mounting adapter 55 which can be fitted to the mounting interface 25 instead of the first mounting adapter 55a. Thus, FIG. 8 shows by way of example a second mounting adapter 55, 55b which has an outer thread 74 by means of which, in order to fix it to the actuating drive 12, it is brought into fastening engagement with the inner thread 36 of the first attachment device 32, 32a. This second mounting adapter 55b is equipped with an axial locking device 64, the structure of which substantially corresponds to the axial locking device 32b' and which also has an annular inclined locking flange 65 concentric with the longitudinal axis 8. An auxiliary device 26, in this case illustrated for example as a stroke limiter module 26d, can, comparably with the embodiments shown in FIGS. 2 and 3, be locked together with the axial locking device 64 with the aid of locking elements, not shown, which in particular correspond to the locking elements 48 described above.

In this connection, FIG. 8 makes it clear that, instead of a circumferential collar 47, a circumferential slot 66 can also be used to define the locking flange 65 with its slot flanks.

FIGS. 6 to 8 make it clear that the valve actuation system 1 can include several mounting adapters which are designed such that they can in each case only be coupled and fixed to one of the several different attachment devices 32, wherein the mounting adapters 55 differ from one another in terms of the mating attachment interfaces which they use, so that they can only be coupled with and fixed to differing configurations of the several different attachment devices 32.

Each mounting adapter 55, 55a, 55b has a mating attachment interface which is designed to be coupled with one of the different attachment devices 32. According to FIG. 7 for example, such a mating attachment interface includes the several through-holes 56 or, according to FIG. 8, the outer thread 74.

It is advantageous if, insofar as the actuating drive 12 can be actuated using fluid force, a fluid transmission device 67 is arranged on the mounting surface 34, as indicated in FIGS. 1 and 4 by dotted-dashed lines. The fluid transmission device 67 creates the possibility, when fitting an auxiliary device 26, of automatically establishing a fluid connection between the relevant auxiliary device 26 and a first fluid control channel 23 formed in the actuating drive 12 and possibly also a second fluid control channel 24. The second fluid control channel 24 is optional and is connected to the rear housing chamber 22b so that in a double-action design of a fluid-driven actuating drive 12 it can be used for controlled fluid pressurisation.

Each fluid control channel 23, 24 is expediently assigned a connecting nipple 68 of the fluid transmission device 67 which projects beyond the mounting surface 34 and engages with the auxiliary device 26 mounted on the mounting interface 25. In this way, a fluid connection can be established to the fluid channels 69 formed in the auxiliary device 26 which open onto an outside surface of the auxiliary device 26 and make possible a connection with a pressure source or with a pressure sink.

Connecting nipples 68 are expediently designed as components separate from the actuating drive 12 and the at least one auxiliary device 26 and are plugged from the axial rear side 14 into channel openings of the associated first and/or second fluid control channel 23, 24 so as to form a seal.

If no special functionality of an auxiliary device 26 is necessary with respect to the actuating drive 12, the auxiliary device 26 can also be a simple connection module 72 which is equipped with the aforementioned fluid channels 69 and provides assigned connection openings 73 which make possible the connection of further-extending fluid lines.

The invention claimed is:

1. A valve actuation system with a drive device, equipped with an axial extension, which comprises an actuating drive with a drive output side intended for coupling with a valve and an axial rear side opposite the drive output side, wherein the actuating drive has on its axial rear side a mounting interface for the attachment of an auxiliary device which interacts with the actuating drive, wherein, in order to allow attachment of the auxiliary device which is to be mounted, or which is mounted, the mounting interface of the actuating drive is equipped with several different attachment devices, which differ in their attachment possibilities and which can be used selectively, wherein the actuating drive has a drive housing in which an output member, which can be driven to perform a drive output movement, is arranged which, in the state of the drive device in which it is attached to the valve, interacts in a driving manner with a valve member of the valve, wherein the actuating drive is a pneumatically-operated actuating drive.

2. The valve actuation system according to claim 1, further comprising at least one auxiliary device mounted on the mounting interface, said auxiliary device being selected from the group consisting of an indicator module, a control head, a positioner, and a stroke limiter module.

3. The valve actuation system according to claim 1, further comprising a process valve, which can be actuated by means of the drive device, wherein the drive device is attached to the process valve with the drive output side foremost.

4. The valve actuation system according to claim 1, wherein the mounting interface of the actuating drive has at least one axially oriented, mounting surface for the auxiliary device which is independent of the different attachment devices.

5. The valve actuation system according to claim 1, wherein the mounting interface is equipped with exactly two or with exactly three different attachment devices.

6. The valve actuation system according to claim 1, wherein, of the several different attachment devices, one attachment device is in the form of a central fastening recess provided with an inner thread.

7. The valve actuation system according to claim 6, wherein the central fastening recess is formed in an axial connecting socket of the actuating drive positioned in the central region of the mounting interface.

8. The valve actuation system according to claim 1, wherein, of the several different attachment devices, one attachment device is designed in the form of an axial locking device with an annular locking flange which can be engaged behind, radially from the outside, by means of a locking element, wherein the locking flange is inclined and/or wherein the axial locking device is positioned in the central region of the mounting interface.

9. The valve actuation system according to claim 8, wherein the axial locking device is formed on a connecting socket of the actuating drive positioned in the central region of the mounting interface, wherein the locking flange is part of a circumferential slot or a circumferential collar of the connecting socket.

10. The valve actuation system according to claim 1, further comprising at least one mounting adapter designed for attachment to at least one of the different attachment devices of the actuating drive, the at least one mounting adapter is in turn equipped with at least one secondary attachment device for attachment of the auxiliary device, such that the auxiliary device can be attached to the actuating drive via the mounting adapter.

11. The valve actuation system according to claim 10, further comprising several mounting adapters, which differ from one another in the design of their secondary attachment devices.

12. The valve actuation system according to claim 10, wherein at least one secondary attachment device is designed in the form of a central fastening recess provided with an inner thread and/or wherein at least one secondary attachment device is designed in the form of an axial locking device with an annular locking flange, which can be engaged behind, radially from the outside, by means of a locking element.

13. A valve actuation system with a drive device, equipped with an axial extension, which comprises an actuating drive with a drive output side intended for coupling with a valve and an axial rear side opposite the drive output side, wherein the actuating drive has on its axial rear side a mounting interface for the attachment of an auxiliary device which interacts with the actuating drive, wherein, in order to allow attachment of the auxiliary device which is to be mounted, or which is mounted, the mounting interface of the actuating drive is equipped with several different attachment devices, which differ in their attachment possibilities and which can be used selectively,
  wherein, of the several different attachment devices, one attachment device is in the form of a threaded fastening hole arrangement, which comprises a plurality of threaded fastening holes distributed around a longitudinal axis of the actuating drive.

14. The valve actuation system according to claim 13, wherein the threaded fastening hole arrangement is a circle of threaded fastening holes arranged concentrically with the longitudinal axis of the actuating drive.

15. A valve actuation system with a drive device, equipped with an axial extension, which comprises an actuating drive with a drive output side intended for coupling with a valve and an axial rear side opposite the drive output side, wherein the actuating drive has on its axial rear side a mounting interface for the attachment of an auxiliary device which interacts with the actuating drive, wherein, in order to allow attachment of the auxiliary device which is to be mounted, or which is mounted, the mounting interface of the actuating drive is equipped with several different attachment devices, which differ in their attachment possibilities and which can be used selectively, and
  wherein the valve actuation system further comprises several mounting adapters, each of the several mounting adapters being designed for attachment to at least one of the different attachment devices of the actuating drive, each of the several mounting adapters is in turn equipped with at least one secondary attachment device for attachment of the auxiliary device, such that the auxiliary device can be attached to the actuating drive via the mounting adapter, and
  wherein the several mounting adapters can be fitted, alternatively to one another, on the mounting interface of the actuating drive, wherein each of these several mounting adapters is designed for attachment to one of the different attachment devices different from at least one other mounting adapter.

* * * * *